US009274840B2

(12) United States Patent
Dawson et al.

(10) Patent No.: US 9,274,840 B2
(45) Date of Patent: Mar. 1, 2016

(54) DYNAMIC MEMORY MANAGEMENT WITH THREAD LOCAL STORAGE USAGE

(71) Applicant: International Business Machines Corporation, Armonk, NY (US)

(72) Inventors: Michael H. Dawson, Ontario (CA); Parijat Dube, Hicksville, NY (US); Liana L. Fo, Irvington, NY (US); Michel H. T. Hack, Cortlandt Manor, NY (US); Graeme Johnson, Ontario (CA); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/842,923

(22) Filed: Mar. 15, 2013

(65) Prior Publication Data

US 2014/0282583 A1 Sep. 18, 2014

(51) Int. Cl.
*G06F 9/46* (2006.01)
*G06F 9/50* (2006.01)

(52) U.S. Cl.
CPC .................................. *G06F 9/5016* (2013.01)

(58) Field of Classification Search
CPC ...................................................... G06F 9/5016
See application file for complete search history.

(56) References Cited

U.S. PATENT DOCUMENTS

| 6,411,983 | B1* | 6/2002 | Gallop ......................... 718/104 |
| 6,427,195 | B1 | 7/2002 | McGowen et al. |
| 7,197,652 | B2* | 3/2007 | Keller et al. ................... 713/320 |
| 7,437,376 | B2 | 10/2008 | Sikchi et al. |
| 7,529,903 | B2* | 5/2009 | Boss et al. .................... 711/165 |
| 7,636,829 | B2* | 12/2009 | Hertzberg et al. ............. 711/170 |
| 7,793,304 | B2* | 9/2010 | Schank et al. ................ 719/320 |
| 7,954,100 | B1 | 5/2011 | Garthwaite |
| 8,533,682 | B2* | 9/2013 | Kakulamarri et al. ........ 717/126 |
| 8,549,523 | B2* | 10/2013 | Krauss ........................... 718/102 |
| 2007/0011420 | A1* | 1/2007 | Boss et al. .................... 711/165 |
| 2008/0147357 | A1* | 6/2008 | Truter ............................ 702/186 |
| 2009/0271769 | A1 | 10/2009 | Krauss |
| 2010/0275207 | A1 | 10/2010 | Radmilac et al. |
| 2011/0088047 | A1* | 4/2011 | Clark ............................ 719/318 |
| 2012/0139926 | A1* | 6/2012 | Clohset et al. ................ 345/502 |
| 2013/0262811 | A1* | 10/2013 | Taguchi ........................ 711/171 |

OTHER PUBLICATIONS

Sade, Yair, "Optimizing C Multithreaded Memory Management Using Thread-Local Storage," Thesis, Nov. 27, 2004, 47 pages, School of Computer Science, Tel-Aviv University, Israel.
Powell, M. L. et al., "SunOS Multi-thread Architecture," USENIX 1991, Dallas, Texas, USA, pp. 1-14.
Marino, Daniel et al., "LiteRace: Effective Sampling for Lightweight Data-Race Detection," PLDI'09, Dublin, Ireland, Jun. 15-20, 2009, 10 pages, ACM Digital Library.

(Continued)

*Primary Examiner* — Van Nguyen
(74) *Attorney, Agent, or Firm* — Ference & Associates LLC

(57) ABSTRACT

Methods and arrangements for dynamic memory management. Data are accepted for thread local storage, and memory usage is monitored in thread local storage. A memory block is allocated to thread local storage for storing accepted data, based on the monitored memory usage.

16 Claims, 3 Drawing Sheets

(56) References Cited

OTHER PUBLICATIONS

Binder, Walter et al., "A Quantitative Evaluation of the Contribution of Native Code to Java Workloads," IEEE International Symposium on Workload Characterization, San Jose, California, USA, Oct. 25-27, 2006, pp. 201-209, IEEE, Washington, DC, USA.
US 8,301,730, 10/2012, Obata et al. (withdrawn)

* cited by examiner

DYNAMIC MEMORY MANAGEMENT WITH THREAD LOCAL STORAGE USAGE

BACKGROUND

Generally, memory management presents challenges inasmuch as a monitoring application therefor normally shares memory on the monitored system itself.

In cloud or data center monitoring, a system allocates different threads to monitor different VMs (virtual machines). Each thread maintains monitoring information or logs about the VM it is monitoring and is configured to generate associated reports in real-time. This leads to a need for an overwhelming use of system memory by monitoring threads.

In contexts of dynamic thread migration (e.g., with "Java"), there is a need to monitor the execution state of Java threads internal to JVMs ("Java Virtual Machines") and transfer this state to a target node on which execution can be restored. Other challenges addressed thereby are workload balancing, a co-location of computation and data, a need to follow a user in his/her movements, and mobile computing. Both application-level and JVM-level implementations involve very significant overhead and have a decisive effect on performance.

BRIEF SUMMARY

In summary, one aspect of the invention provides a method comprising: utilizing a processor to execute computer code configured to perform the steps of: accepting data for thread local storage; monitoring memory usage in thread local storage; and allocating to thread local storage a memory block for storing accepted data, based on the monitored memory usage.

Another aspect of the invention provides an apparatus comprising: at least one processor; and a computer readable storage medium having computer readable program code embodied therewith and executable by the at least one processor, the computer readable program code comprising: computer readable program code configured to accept data for thread local storage; computer readable program code configured to monitor memory usage in thread local storage; and computer readable program code configured to allocate to thread local storage a memory block for storing accepted data, based on the monitored memory usage.

An additional aspect of the invention provides a computer program product comprising: a computer readable storage medium having computer readable program code embodied therewith, the computer readable program code comprising: computer readable program code configured to accept data for thread local storage; computer readable program code configured to monitor memory usage in thread local storage; and computer readable program code configured to allocate to thread local storage a memory block for storing accepted data, based on the monitored memory usage.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
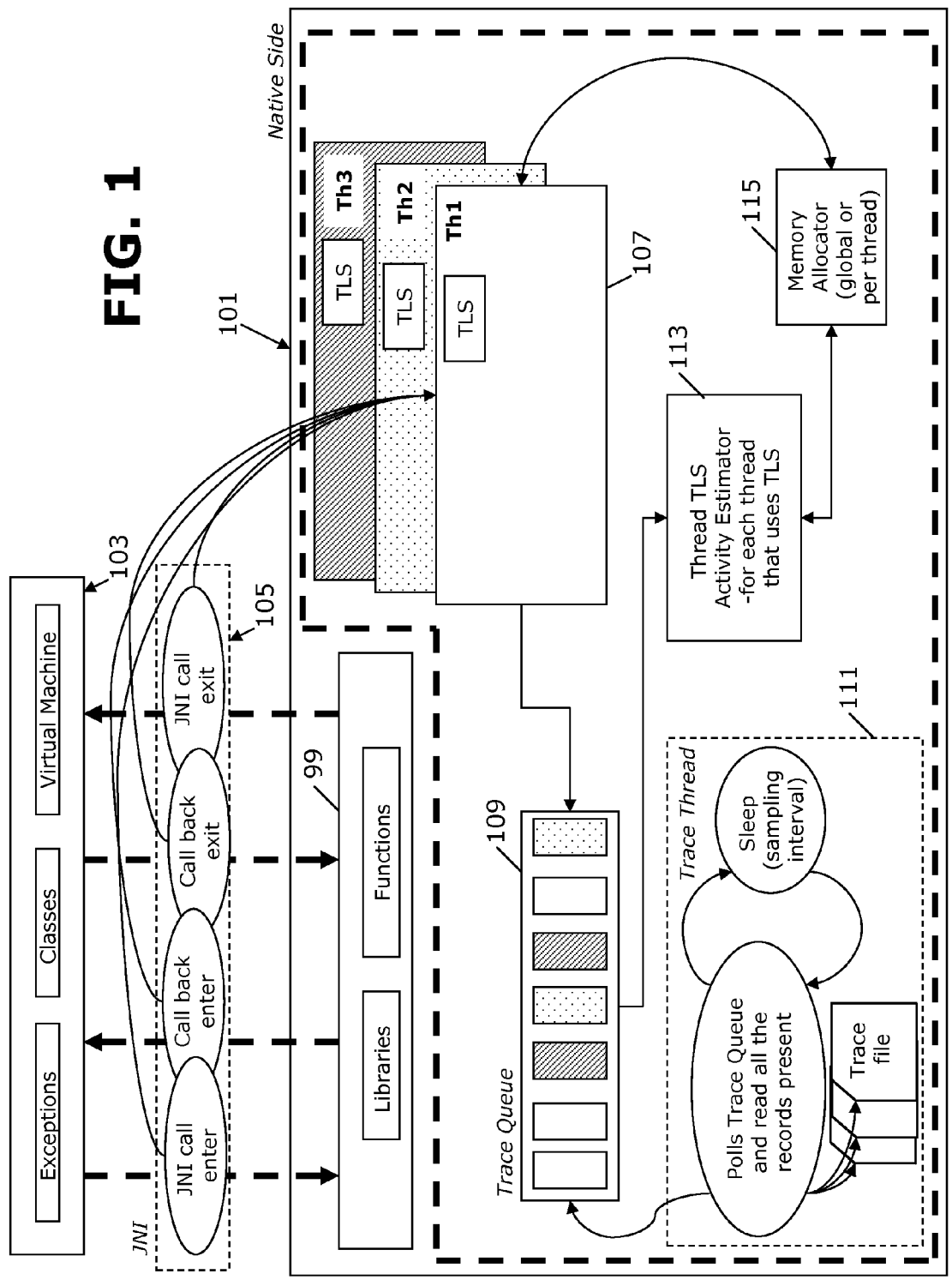
FIG. 1 schematically illustrates an embodiment of per-thread tracing.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

By way of general background, in accordance with at least one embodiment of the invention, thread local storage (TLS) involves threads of the same process sharing a process address space. Static variables and global variables are shared by all threads in the process, and stored in a heap segment. Local variables, of a function unique to each thread that runs the function, are stored in a stack segment and lost when a function exits. Accordingly, TLS permits each thread to store and process data structures locally without storing the variable on the stack. As such, each TLS is allocated a global index which can be accessed by other threads to retrieve the unique data stored at this index. Thus, in using TLS, a TLS index is allocated, and a block of memory is allocated and then pinned to TLS. A thread can release the TLS index and associated memory block, or this can happen automatically when the thread is terminated. A variety of languages are able to support TLS.

As such, and continuing by way of general background in accordance with at least one embodiment of the invention, it can be appreciated that advantages are present in the use of local copy in TLS as opposed to synchronization. Particularly, while synchronization (e.g., mutexes, semaphores) can cause blocking, threads using TLS end up storing and processing data locally and then joining results from different threads at the end. This results in little or no locking, and much easier coding.

At the same time, by way of continued background in accordance with at least one embodiment of the invention, TLS can involve significant memory usage and thereupon warrants an efficient management of memory blocks allocated to TLS variables of different threads. This can present its own set of challenges. Generally, memory blocks to be allocated to TLS need to be manually specified using malloc() and freed using free(). In this context, programmers tend to follow a practice of fixed size and static allocation when using TLS. This works well if TLS is being employed solely for maintaining a data structure with known size. On the other hand, if information being stored at TLS is run-time dependent, then the size of a memory block allocated to TLS will affect performance. The allocation of memory in even small blocks will result in increased malloc() and free() operations, while the allocation of memory in large blocks will result in an inefficient usage of memory; for instance, there may be unused memory units within allocated memory blocks for low activity threads Accordingly, by way of continued background in accordance with at least one embodiment of the invention, a challenge emerges in determining how much memory to allocate to TLS of a thread. Ideally, one would like to allocate as much memory to TLS as is needed by a thread for storing information at TLS. However, one cannot foresee the amount of data generated by a thread for storing at TLS.

Broadly contemplated herein, in accordance with at least one embodiment of the invention, are methods and arrangements for dynamic management of memory allocation to TLS of threads in multithreaded environments, particularly by accounting for the rate of TLS memory usage by threads. As such, it can be appreciated that advantages are thereby gained inasmuch as conventional TLS implementations do not tie memory allocation to the rate of data generated and stored at TLS by a thread, thus resulting in inefficient memory usage (e.g., unused TLS memory blocks by low activity threads, increased allocation and freeing of memory blocks by high activity threads).

In accordance with at least one embodiment of the invention, TLS usage by threads is monitored, and the time needed to fill a TLS memory block of a given size is tracked. The activity level of threads is calculated. This can be determined, at least in part, by a determination of time needed to fill a TLS memory block as determined currently and/or previously, and by thread TLS memory size. Thus, the faster the rate at which a thread fills TLS memory, the higher the activity level for the thread.

In accordance with at least one embodiment of the invention, there is determined a TLS memory block to be allocated to a thread. The size of the memory block to be so allocated is correlated with thread activity level. As such, by giving larger memory blocks to high activity level threads, malloc() and free() operations will be reduced, while by giving smaller memory blocks to low activity threads and de-allocating memory blocks from inactive threads, memory usage efficiency will increase.

FIG. 1 schematically illustrates an embodiment of per-thread JNI (Java Native Interface) tracing, in accordance with at least one embodiment of the invention. As shown, libraries and functions (99) at a native side 101 (which could involve a language such as C or C++) interact with a Java Virtual Machine (JVM) environment 103 with virtual machines (including exceptions and classes) via a JNI 105 for each thread. Four phases (or methods or processes) of JNI activity are shown: JNI call enter, call back enter, call back exit and JNI call exit. Trace data from each of these are saved at TLS with respect to different threads 107 (e.g., Th1, Th2, Th3 as shown). Trace data at TLS includes aggregate statistics counters and records for each method call, marinating in a stack of allocated size (determined by a memory allocator). While a case involving several threads is shown and described herein with respect to FIG. 1, it should be understood that processes and actions as broadly contemplated herein (such as thread monitoring) can alternatively be undertaken with respect to solely one thread.

In accordance with at least one embodiment of the invention, the threads 107 (Th1/Th2/Th3) are execution streams managed by the JVMs 103, and it is their activity (i.e. the types of calls they make) that is being monitored, and recorded in trace files. Thus, as shown, thread trace (111) takes place via polling a trace queue 109, reading all the records present, optionally including a sleep or sampling interval between reads, and recording thread activity in trance files. The TLS memory blocks in threads 107 are used to buffer the data from the collection point to the point where they are moved to the trace files.

In accordance with at least one embodiment of the invention, when a method stack of a thread is full, stack memory is unpinned from TLS and a pointer to the stack is inserted in a single queue of stack pointers, or the trace queue 109. TLS activity estimation (113), and TLS memory allocation (115), then can proceed in a manner as follows.

In accordance with at least one embodiment of the invention, a TLS activity estimator 113 operates as follows. Generally, thread activity level can be measured by how quickly it fills an allocated memory block. At each sampling time n of Trace Queue 109 (referred to here as TQ), for any active thread i using TLS update its activity rate is:

$$ActivityRate_{i,n} = \frac{LatestEntryBlockSize_{i,n}}{LatestEntryTimeinTQ_{i,n} - SecondLatestEntryTimeinTQ_{i,n}},$$

where $LatestEntryBlockSize_{i,n}$ is the TLS memory size of the stack corresponding to the latest entry by thread i in the TQ, $LatestEntryTimeinTQ_{i,n}$ is the time at which the latest entry is made by thread i in TQ and $SecondLatestEntryTimeinTQ_{i,n}$ is the time at which the second latest entry is made by thread i in TQ. Thus, the denominator in the RHS (right hand side) of the equation above is roughly a measure of the time to fill up the TLS memory block of size $LatestEntryBlockSize_{i,n}$, under the assumption that the time to allocate a new memory block to TLS of thread i is negligible.

At any time n, let $\Delta_{i,n} = n - LastEntryTimeinTQ_{i,n}$ be the time since the latest creation of an entry in TQ by thread i. To obtain a TLS activity rate at time t for a thread, the recent sample of ActivityRate is discounted by using $\Delta_{i,n}$ in an exponential discounting equation as follows:

$$DiscountedActivityRate_{i,n} = ActivityRate_{i,n} * e^{-\theta \Delta_{i,n}}$$

Here, $\theta$ is the control parameter to account for time discounting.

In accordance with at least one embodiment of the invention, a TLS Block Size Calculator operates as follows. At each new malloc, block size is doubled. Alternatively, at each new malloc, there is an additive increase (as opposed to multiplicative doubling), at the corresponding time n, as follows:

$$b_{i,n+1} = b_{i,n} + f(ActivityRate_{i,n}, \Delta_{i,n})$$

Here, f represents a general function which shows an increase with ActivityRate and also a decrease with elapsed time ($\Delta$) since the latest entry in TQ by thread i. The elapsed time can be measured in real-time or CPU time. As to a choice of function f, various choices are possible subject to the stated monotonicity constraints.

Figure 2:
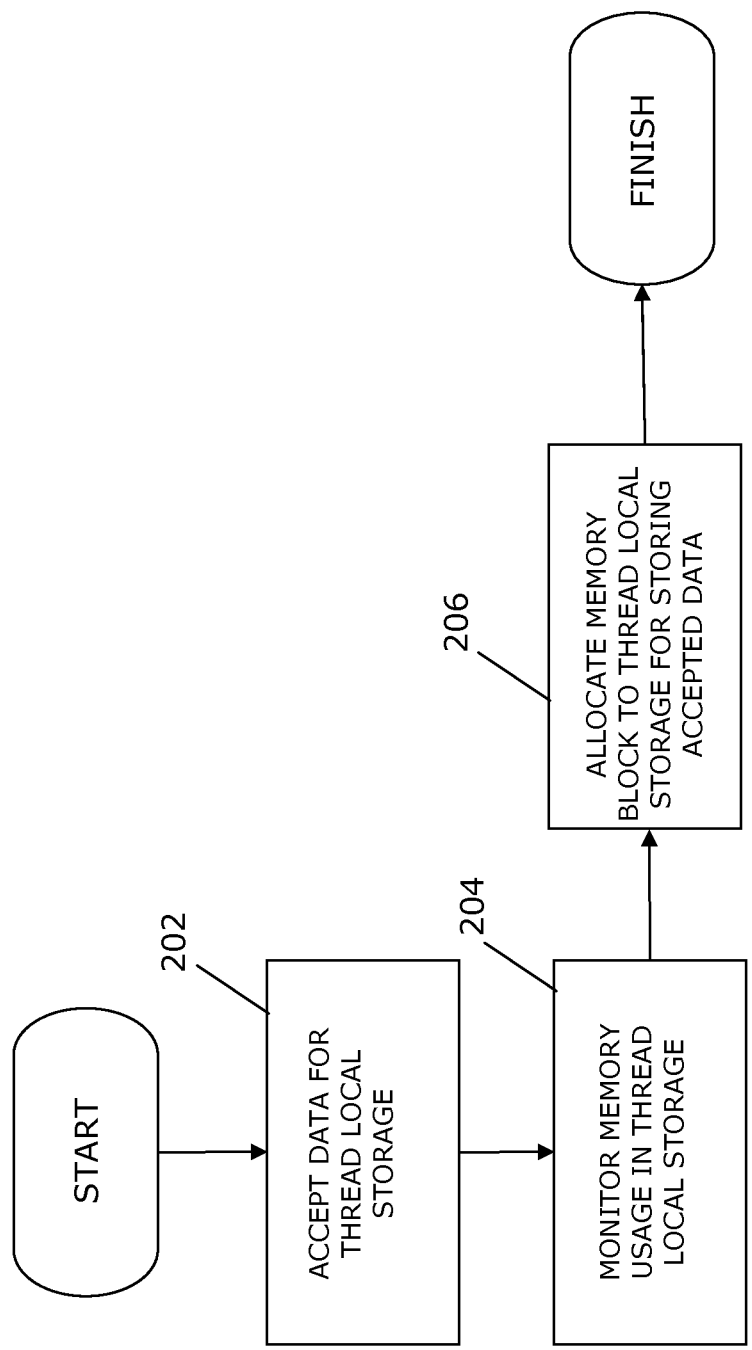
FIG. 2 sets forth a process more generally for dynamic memory management.

FIG. 2 sets forth a process more generally for dynamic memory management, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, data are accepted for thread local storage (202), and memory usage is monitored in thread local storage (204). A memory block is allocated to thread local storage for storing accepted data, based on the monitored memory usage (206).

Figure 3:
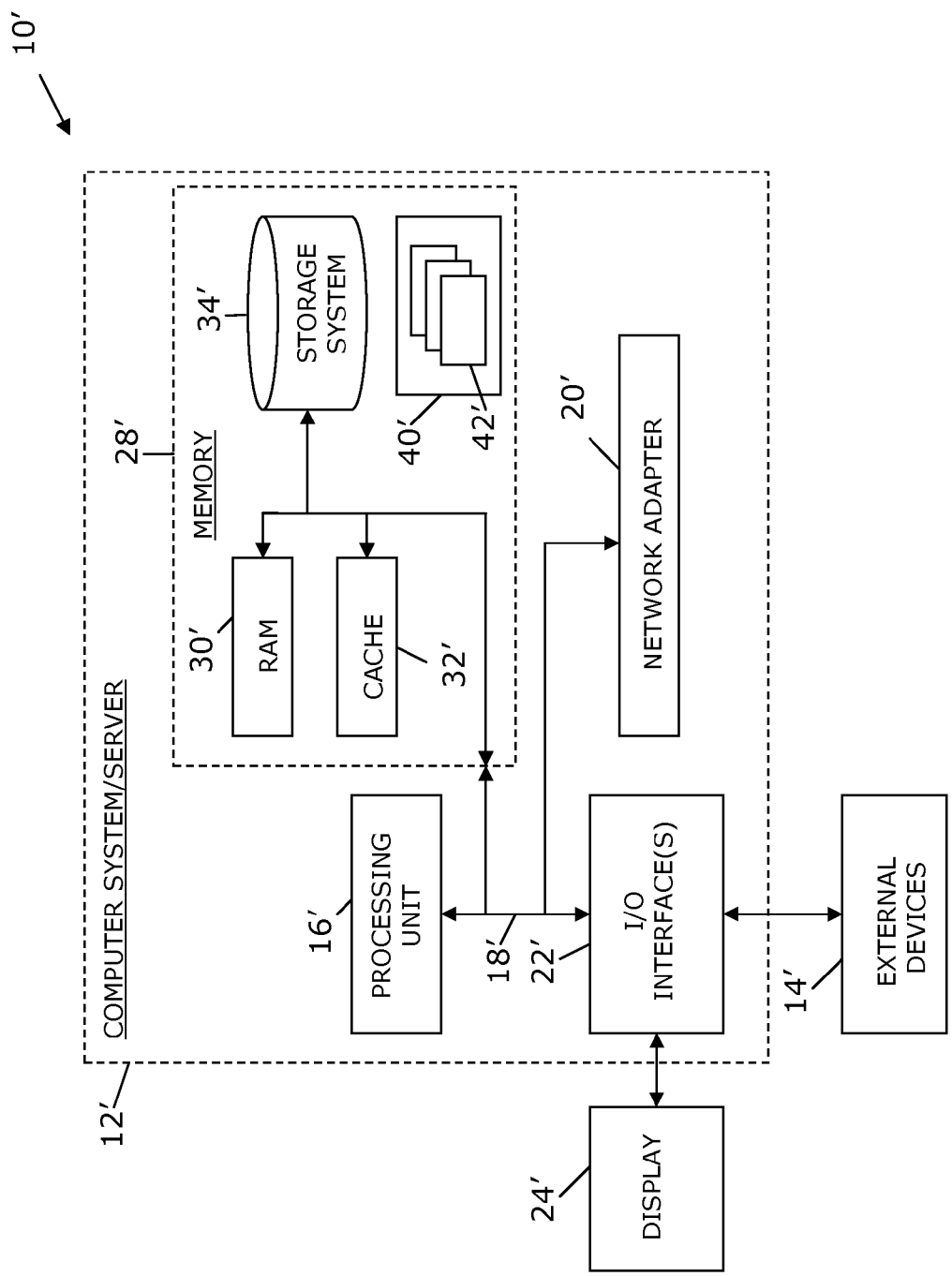
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing a processor to execute computer code configured to perform the steps of:
accepting data for thread local storage, the thread local storage comprising threads for monitoring virtual machines, wherein each thread stores and processes data structures locally without storing a variable on a stack;
monitoring memory usage in thread local storage via determining thread activity; and
allocating to the thread local storage a memory block for storing accepted data, based on the monitored memory usage;
said allocating comprising determining a memory block size correlated to thread activity.

2. The method according to claim 1, wherein said monitoring comprises monitoring memory usage with respect to thread local storage of at least two threads.

3. The method according to claim 1, wherein said monitoring comprises determining a time for filling a predetermined thread local storage memory block.

4. The method according to claim 3, wherein said determining of a time comprises determining a current or previous time period for filling a predetermined thread local storage memory block.

5. The method according to claim 1, wherein said allocating comprises deallocating at least one thread local storage one memory block from an inactive thread.

6. The method according to claim 1, wherein said allocating further comprises determining a memory block size inversely correlated to elapsed time since a previous entry to a thread queue by a given thread.

7. The method according to claim 1, wherein said allocating comprises determining a memory block size inversely correlated to elapsed time since a previous entry to a thread queue by a given thread.

8. The method according to claim 1, wherein said determining comprises determining a previous thread activity rate via discounting related to elapsed time since a previous entry to a thread queue by a given thread.

9. An apparatus comprising:
at least one processor; and
a computer readable storage medium having computer readable program code embodied therewith and executable by the at least one processor, the computer readable program code comprising:
computer readable program code configured to accept data for thread local storage, the thread local storage comprising threads for monitoring virtual machines, wherein each thread stores and processes data structures locally without storing a variable on a stack;
computer readable program code configured to monitor memory usage in thread local storage via determining thread activity; and
computer readable program code configured to allocate to the thread local storage a memory block for storing accepted data, based on the monitored memory usage;
the allocating comprising determining a memory block size correlated to thread activity.

10. A computer program product comprising:
a non-transitory computer readable storage medium having computer readable program code embodied therewith, the computer readable program code comprising:
computer readable program code configured to accept data for thread local storage, the thread local storage comprising threads for monitoring virtual machines, wherein each thread stores and processes data structures locally without storing a variable on a stack;
computer readable program code configured to monitor memory usage in thread local storage via determining thread activity; and
computer readable program code configured to allocate to the thread local storage a memory block for storing accepted data, based on the monitored memory usage;
the allocating comprising determining a memory block size correlated to thread activity.

11. The computer program product according to claim 10, wherein said computer readable program code is configured to monitor memory usage with respect to thread local storage of at least two threads.

12. The computer program product according to claim 10, wherein said computer readable program code is configured to determine a time for filling a predetermined thread local storage memory block.

13. The computer program product according to claim 12, wherein said computer readable program code is configured to determine a current or previous time period for filling a predetermined thread local storage memory block.

14. The computer program product according to claim 10, wherein said computer readable program code is configured to deallocate at least one thread local storage memory block from an inactive thread.

15. The computer program product according to claim 10, wherein said computer readable program code is configured to determine a memory block size inversely correlated to elapsed time since a previous entry to a thread queue by a given thread.

16. The computer program product according to claim 10, wherein said computer readable program code is configured to determine a previous thread activity rate via discounting related to elapsed time since a previous entry to a thread queue by a given thread.

* * * * *